(12) United States Patent
Nishitani (10) Patent No.: US 10,669,905 B2
(45) Date of Patent: Jun. 2, 2020

(54) INTERNAL COMBUSTION ENGINE AND METHOD FOR MANUFACTURING INTERNAL COMBUSTION ENGINE

(71) Applicant: TOYOTA JIDOSHA KABUSHIKI KAISHA, Aichi-ken (JP)

(72) Inventor: Koichi Nishitani, Toyonaka (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/355,868

(22) Filed: Mar. 18, 2019

(65) Prior Publication Data

US 2019/0292954 A1    Sep. 26, 2019

(30) Foreign Application Priority Data

Mar. 23, 2018 (JP) ................... 2018-056643

(51) Int. Cl.
| | | |
|---|---|---|
| *F01M 13/04* | (2006.01) | |
| *B01D 45/08* | (2006.01) | |
| *F02F 1/22* | (2006.01) | |

(52) U.S. Cl.
CPC ............ *F01M 13/04* (2013.01); *B01D 45/08* (2013.01); *F02F 1/22* (2013.01); *F01M 2013/0433* (2013.01)

(58) Field of Classification Search
CPC ........... F01M 13/04; F01M 2013/0433; B01D 45/08; F02F 1/22
See application file for complete search history.

(56) References Cited

U.S. PATENT DOCUMENTS

| | | | | |
|---|---|---|---|---|
| 3,172,399 A | * | 3/1965 | Lentz | .................. F01M 13/025 |
| | | | | 123/572 |
| 4,502,424 A | * | 3/1985 | Katoh | ..................... F01M 5/00 |
| | | | | 123/196 R |
| 8,875,686 B2 | | 11/2014 | Iwata | |
| 2004/0159313 A1 | * | 8/2004 | Obayashi | ............... F01M 13/04 |
| | | | | 123/572 |
| 2009/0090337 A1 | * | 4/2009 | Asanuma | ............. F01M 13/022 |
| | | | | 123/574 |
| 2016/0146076 A1 | | 5/2016 | Newman et al. | |
| 2016/0312686 A1 | | 10/2016 | Christian et al. | |
| 2017/0175601 A1 | * | 6/2017 | Usa | ........................ F01M 13/04 |

FOREIGN PATENT DOCUMENTS

| | | |
|---|---|---|
| DE | 102016107328 A1 | 10/2016 |
| JP | H6-76614 U | 10/1994 |
| JP | 2010-174734 A | 8/2010 |
| JP | 2014-214680 A | 11/2014 |
| JP | 2016-56713 A | 4/2016 |

* cited by examiner

*Primary Examiner* — Hung Q Nguyen
(74) *Attorney, Agent, or Firm* — Hauptman Ham, LLP (57) ABSTRACT

A separation portion of an oil separator is located upward from an opening of a second blow-by gas passage portion in an outer surface of a cylinder block. A connection passage connects the separation portion and the second blow-by gas passage portion. At least part of the connection passage located toward the second blow-by gas passage portion serves as a first passage portion. The second blow-by gas passage portion and the first passage portion serve as an intermediate passage. A step is arranged in the intermediate passage at an intermediate portion with respect to an extension direction of the intermediate passage.

6 Claims, 3 Drawing Sheets

INTERNAL COMBUSTION ENGINE AND METHOD FOR MANUFACTURING INTERNAL COMBUSTION ENGINE

RELATED APPLICATIONS

The present application claims priority of Japanese Application Number 2018-056643, filed on Mar. 23, 2018, the disclosure of which is hereby incorporated by reference herein in its entirety.

BACKGROUND

The present disclosure relates to an internal combustion engine and a method for manufacturing an internal combustion engine.

Japanese Laid-Open Patent Publication No. 2010-174734 discloses an internal combustion engine. A cylinder block of the internal combustion engine includes a blow-by gas passage that returns blow-by gas leaked into an oil pan to an intake passage. The upstream end of the blow-by gas passage opens toward an inner side of the oil pan, and the downstream end of the blow-by gas passage opens in an outer surface of the cylinder block. An oil separator is connected to the downstream opening of the blow-by gas passage. The oil separator is connected to the intake passage of the internal combustion engine through a recirculation passage.

With the internal combustion engine described in the publication, volatile fuel flowing into the oil separator along with the blow-by gas is liquefied in the oil separator. A portion of the liquefied oil flows downward into the oil pan through the blow-by gas passage. In this case, if the blow-by gas rushes into the blow-by gas passage from the oil pan, the flow of the blow-by gas may force the oil back to the oil separator.

SUMMARY

Examples of the present disclosure will now be described.

Example 1

An internal combustion engine including a cylinder block; a blow-by gas passage defined inside the cylinder block, wherein the blow-by gas passage is configured to return blow-by gas to an intake passage; and an oil separator connected to the blow-by gas passage and the intake passage, wherein the oil separator is configured to separate oil from the blow-by gas, wherein in a state in which the internal combustion engine is mounted on a vehicle, an up-down direction of the vehicle is referred to as a vertical direction, and a plane orthogonal to the vertical direction is referred to as a horizontal plane, the blow-by gas passage includes a first blow-by gas passage portion open downward in the vertical direction of the cylinder block, wherein the first blow-by gas passage portion extends upward in the vertical direction of the cylinder block from an opening of the first blow-by gas passage portion directed downward in the vertical direction, and a second blow-by gas passage portion continuous with the first blow-by gas passage portion, wherein the second blow-by gas passage portion extends so that an inclination angle of an extension direction of the second blow-by gas passage portion relative to the horizontal plane is less than an inclination angle of an extension direction of the first blow-by gas passage portion relative to the horizontal plane, and the second blow-by gas passage portion opens in an outer surface of the cylinder block, the oil separator includes a separation portion located upward from an opening of the second blow-by gas passage portion in the outer surface of the cylinder block, wherein the separation portion is configured to separate oil from the blow-by gas, and a connection passage connecting the separation portion and the second blow-by gas passage portion, at least part of the connection passage that is located toward the second blow-by gas passage portion serves as a first passage portion, wherein the first passage portion is configured to extend so that an inclination angle of the first passage portion relative to the horizontal plane is less than an inclination angle of an extension direction of the first blow-by gas passage portion relative to the horizontal plane, and the second blow-by gas passage portion and the first passage portion of the connection passage are referred to as an intermediate passage, and a step is arranged in the intermediate passage at an intermediate portion with respect to an extension direction of the intermediate passage, wherein the intermediate passage has a cross-sectional area at a downstream side with respect to a flow direction of the blow-by gas that is smaller than a cross-sectional area of the intermediate passage at an upstream side with respect to the flow direction of the blow-by gas.

With the above structure, even if the oil collected on the inner wall surface of the blow-by gas passage and the connection passage flows toward the separation portion of the oil separator, the step blocks the oil in the intermediate passage and restricts further flow toward the separation portion. This limits the movement of oil to the separation portion of the oil separator through the intermediate passage. In particular, the inclination angle of the intermediate passage (second blow-by gas passage portion and first passage portion of connection passage) relative to the horizontal plane is less than the inclination angle of the first blow-by gas passage portion relative to the horizontal plane. Thus, the intermediate passage allows oil to be returned to the separation portion of the oil separator through the intermediate passage. The formation of the step further restricts the backflow of oil to the separation portion of the oil separator.

Example 2

The internal combustion engine according to Example 1, wherein the cross-sectional area of the intermediate passage at the downstream side of the step with respect to the flow direction of the blow-by gas may entirely have a constant cross-sectional area in an extension direction of the downstream side.

With the above structure, the downstream side of the intermediate passage in the flow direction of blow-by gas relative to the step has no recesses or steps caused by changes in the cross-sectional area. Thus, when oil separated by the separation portion of the oil separator flows through the intermediate passage toward the oil pan, the flow of oil is not interrupted by recesses or steps.

Example 3

The internal combustion engine according to Example 1 or 2, wherein the opening of the second blow-by gas passage portion in the outer surface of the cylinder block has an area that may be larger than an area of the opening of the connection passage located toward the second blow-by gas passage portion, and the step may be located where the second blow-by gas passage portion is connected to the connection passage.

With the above structure, the step is formed in the intermediate passage by merely setting the area of the opening of the second blow-by gas passage portion in the outer surface of the cylinder block differently from the area of the opening in the portion of the connection passage connected to the second blow-by gas passage portion. This simplifies the manufacturing process of the internal combustion engine without the need for additional parts or complicated processing.

Example 4

The internal combustion engine according to any one of Examples 1 to 3, wherein the intermediate passage that includes an inner wall surface having a lowermost portion may be referred to as a bottom in a cross-sectional view orthogonal to the extension direction of the intermediate passage, and the step may be arranged on at least the bottom.

Oil on the inner wall surface of the intermediate passage easily collects on the bottom, which is the lowermost portion of the inner wall surface of the intermediate passage. With the above structure, the step formed at such a location where oil easily collects preferably restricts the backflow of the oil to the oil separator.

Example 5

An oil separator that may be applied to the internal combustion engine according to any one of Examples 1 to 4 is provided.

Example 6

A method for manufacturing an internal combustion engine, the method including forming a blow-by gas passage inside a cylinder block to return blow-by gas to an intake passage; providing an oil separator to separate oil from the blow-by gas; and connecting the oil separator to the blow-by gas passage and the intake passage, wherein in a state in which the internal combustion engine is mounted on a vehicle, an up-down direction of the vehicle is referred to as a vertical direction, and a plane orthogonal to the vertical direction is referred to as a horizontal plane, the forming a blow-by gas passage includes forming a first blow-by gas passage portion open downward in the vertical direction of the cylinder block, wherein the first blow-by gas passage portion extends upward in the vertical direction of the cylinder block from an opening of the first blow-by gas passage portion directed downward in the vertical direction, and forming a second blow-by gas passage portion continuously with the first blow-by gas passage portion, wherein the second blow-by gas passage portion extends so that an inclination angle of an extension direction of the second blow-by gas passage portion relative to the horizontal plane is less than an inclination angle of an extension direction of the first blow-by gas passage portion relative to the horizontal plane, and the second blow-by gas passage portion opens in an outer surface of the cylinder block, the providing an oil separator includes forming a separation portion located upward from an opening of the second blow-by gas passage portion in the outer surface of the cylinder block, wherein the separation portion is configured to separate oil contained in blow-by gas, forming a connection passage connecting the separation portion and the second blow-by gas passage portion, and forming a first passage portion that is at least part of the connection passage located toward the second blow-by gas passage portion, wherein the first passage portion extends so that an inclination angle of the first passage portion relative to the horizontal plane is less than an inclination angle of an extension direction of the first blow-by gas passage portion relative to the horizontal plane, and the connecting the oil separator to the blow-by gas passage and the intake passage includes when the second blow-by gas passage portion and the first passage portion of the connection passage are referred to as an intermediate passage, arranging a step in the intermediate passage at an intermediate portion with respect to an extension direction of the intermediate passage, wherein the intermediate passage has a cross-sectional area at a downstream side with respect to a flow direction of the blow-by gas that is smaller than a cross-sectional area of the intermediate passage at an upstream side with respect to the flow direction of the blow-by gas.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION

One embodiment of an internal combustion engine of the present disclosure will now be described with reference to FIGS. 1 and 2. In the present embodiment, an internal combustion engine is installed in a vehicle. The up-down direction of the internal combustion in a state in which the internal combustion engine is mounted on the vehicle is referred to as the vertical direction (up-down direction) of the internal combustion engine, and a plane orthogonal to the vertical direction is referred to as the horizontal plane.

Figure 1:
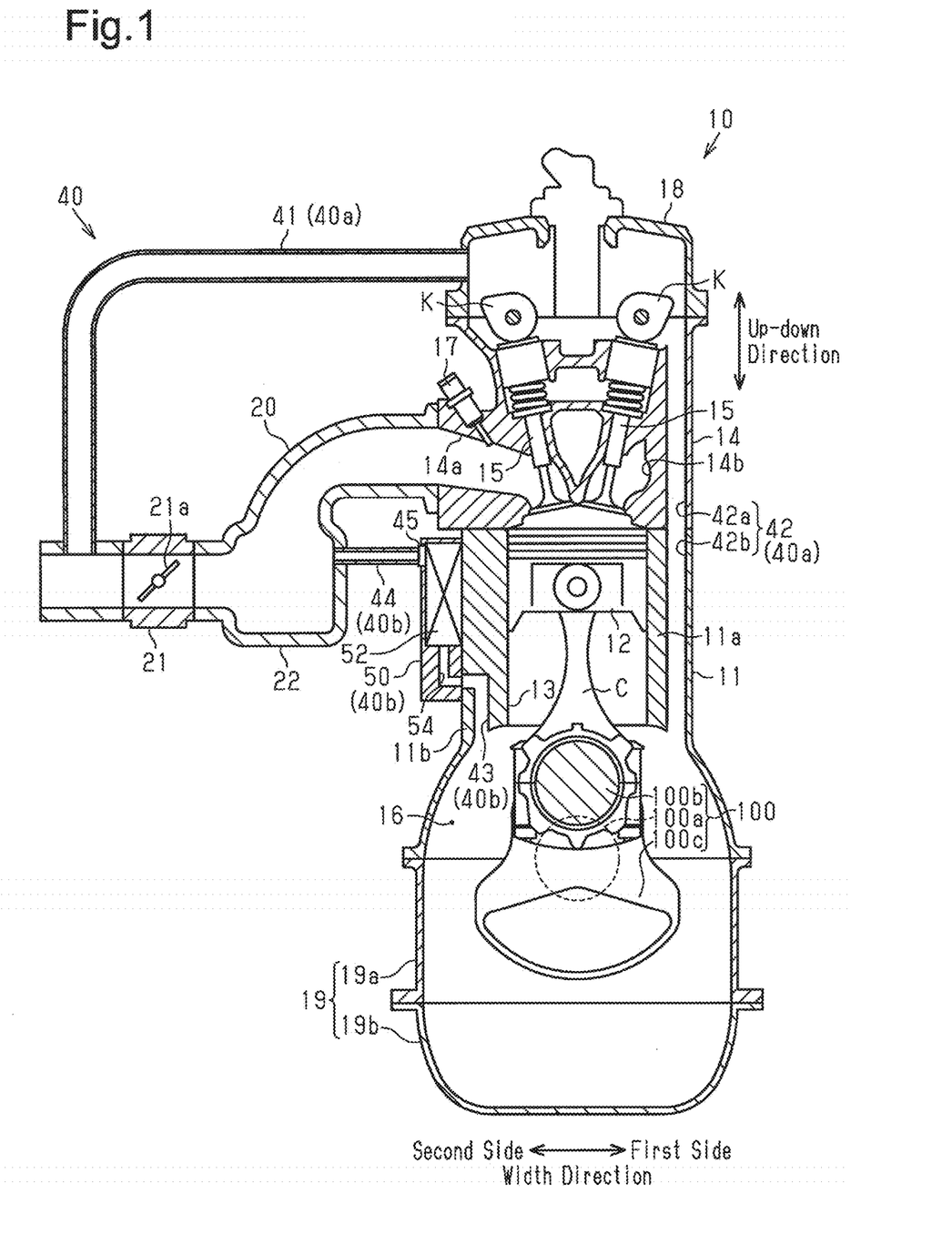
FIG. 1 is a cross-sectional view schematically showing an internal combustion engine according to one embodiment of the present invention.

As shown in FIG. 1, an engine body 10 of the internal combustion engine includes a cylinder block 11, which is a substantially rectangular parallelepiped in its entirety. A cylinder 13 is defined inside the cylinder block 11. The axis of the cylinder 13 extends in the up-down direction. The cylinder 13 opens in the upper surface of the cylinder block 11. Plural cylinders 13 are arranged (only one shown in FIG. 1). The cylinders 13 are aligned in the axial direction of a crankshaft 100. The cylinders each include a piston 12 reciprocating inside the cylinder 13.

A crank chamber 16 is defined inside the cylinder block 11 downward from the cylinders 13. A direction orthogonal to both the up-down direction and the axial direction of the crankshaft 100 (perpendicular to plane of FIG. 1) is referred to as the width direction (sideward direction in FIG. 1) of the engine body 10, and the crank chamber 16 has a greater dimension than the cylinder 13 in the width direction. Further, the crank chamber 16 opens in the lower end surface of the cylinder block 11.

A crank cap (not shown) is attached to the lower end surface of the cylinder block 11. A crank journal 100a of the crankshaft 100 is rotationally supported between the lower end surface of the cylinder block 11 and the crank cap. A crankpin 100b of the crankshaft 100 is connected to one end of a connecting rod C. Another end of the connecting rod C is connected to the piston 12. A counterweight 100c is attached to the crank journal 100a of the crankshaft 100 to offset the inertial force of the piston 12.

A box-shaped oil pan 19, which is substantially rectangular in its entirety, is fixed to the lower side of the cylinder block 11. The oil pan 19 is formed by a substantially tetragonal frame-shaped crankcase 19a and a substantially tetragonal box-shaped reservoir case 19b. The crankcase 19a has an open upper side and an open lower side. The reservoir case 19b has an open upper side and is coupled to the lower side of the crankcase 19a. Oil that lubricates various portions of the engine body 10 is stored in the bottom portion of the reservoir case 19b.

A cylinder head 14, which is a substantially rectangular parallelepiped in its entirety, is fixed to the upper side of the cylinder block 11. The cylinder head 14 includes an intake port 14a, through which intake air is drawn from the outside into the cylinder 13 of the cylinder block 11, and an exhaust port 14b, through which exhaust gas is discharged from the cylinder 13 out of the cylinder block 11. Valves 15 that open and close openings of the intake port 14a and the exhaust port 14b are attached to the cylinder head 14. Camshafts and cams K that convert the rotational movement of the camshafts into opening and closing movements of the valves 15 are arranged in the upper portion of the cylinder head 14. A fuel injection valve 17 that injects fuel toward the opening of the intake port 14a is attached to the cylinder head 14.

A cylinder head cover 18, which is a substantially rectangular parallelepiped in its entirety, is fixed to the upper side of the cylinder head 14. The cylinder head cover 18 has an open lower side and covers the upper surface of the cylinder head 14.

An intake passage 20, through which intake air is drawn from the outside into the intake port 14a, is connected to the intake port 14a of the cylinder head 14. A throttle body 21 that adjusts the amount of intake air is arranged in the intake passage 20 at an intermediate portion with respect to an extension direction of the intake passage 20. A butterfly throttle valve 21a is arranged inside the throttle body 21. A surge tank 22 reduces the pulsation of the intake air at an intake air downstream side of the throttle body 21 in the intake passage 20.

The internal combustion engine includes a blow-by gas ventilation system 40. The blow-by gas ventilation system 40 vents blow-by gas, which leaks through the sliding surfaces of the piston 12 and the cylinder 13 into the oil pan 19 (crank chamber 16). The blow-by gas ventilation system 40 includes a fresh air inlet passage 40a, through which air is drawn into the crank chamber 16 when blow-by gas is vented, and a discharge passage 40b, through which blow-by gas is discharged from the crank chamber 16 into the intake passage 20 when blow-by gas is vented.

The fresh air inlet passage 40a includes an upstream fresh air inlet passage 41 and a downstream fresh air inlet passage 42. The upstream fresh air inlet passage 41 is formed by a pipe extending from an upstream portion of the throttle body 21 in the intake passage 20 to the inside of the cylinder head cover 18. The downstream fresh air inlet passage 42 includes a head passage 42a and a block passage 42b. The head passage 42a extends through the cylinder head 14 in the up-down direction. The block passage 42b is continuous with the head passage 42a. The block passage 42b extends in the up-down direction through a side wall 11a located at a first side (right side in FIG. 1) of the cylinder 13 with respect to the width direction of the cylinder block 11 and opens toward the crank chamber 16. The upstream fresh air inlet passage 41 and the downstream fresh air inlet passage 42 are in communication with each other through the internal space of the cylinder head cover 18.

The discharge passage 40b of the blow-by gas ventilation system 40 includes a blow-by gas passage 43 that forms an upstream portion of the discharge passage 40b, an oil separator 50 that forms a middle portion of the discharge passage 40b, and a return passage 44 that forms a downstream portion of the discharge passage 40b.

The blow-by gas passage 43 is defined inside the cylinder block 11. Specifically, the blow-by gas passage 43 is defined by a side wall 11b located at a second side of the cylinder 13 with respect to the width direction of the cylinder block 11. The blow-by gas passage 43 is located upward from the crank chamber 16 in the vertical direction. The blow-by gas passage 43 is bent to extend in an L-shaped manner in a cross-sectional view taken in a direction orthogonal to the axial direction of the crankshaft 100. That is, as shown in FIG. 2, the blow-by gas passage 43 includes a first blow-by gas passage portion 43a extending in the vertical direction and a second blow-by gas passage portion 43b extending in the horizontal direction. The first blow-by gas passage portion 43a extends in the vertical direction. Thus, the first blow-by gas passage portion 43a extends in a direction inclined by an angle of 90 degrees relative to the horizontal plane. Further, the second blow-by gas passage portion 43b extends in the horizontal direction. Thus, the second blow-by gas passage portion 43b extends in a direction inclined by zero degrees relative to the horizontal plane. Since the first blow-by gas passage portion 43a extends in the vertical direction and the second blow-by gas passage portion 43b extends in the horizontal direction, the second blow-by gas passage portion 43b extends such that the inclination angle of the extension direction of the second blow-by gas passage portion 43b relative to the horizontal plane is less than the inclination angle of the extension direction of the first blow-by gas passage portion 43a relative to the horizontal plane.

The first blow-by gas passage portion 43a opens toward the inside of the oil pan 19 (crank chamber 16). That is, the first blow-by gas passage portion 43a includes an opening 43a1 connected to the crank chamber 16. In other words, the first blow-by gas passage portion 43a opens in the upper surface (top surface) of the crank chamber 16. That is, the first blow-by gas passage portion 43a includes the opening 43a1 in the upper surface (top surface) of the crank chamber 16. The first blow-by gas passage portion 43a extends upward in the vertical direction from the opening 43a1.

The second blow-by gas passage portion 43b extends from the upper end of the first blow-by gas passage portion 43a toward the second side in the width direction of the cylinder block 11. The second blow-by gas passage 43b opens in a side surface 11b1 at the second side in the width direction of the cylinder block 11. That is, the second blow-by gas passage portion 43b includes an opening 43b1 in the side surface 11b1 at the second side in the width direction of the cylinder block 11. In the present embodiment, the first blow-by gas passage portion 43a and the second blow-by gas passage portion 43b are both shaped to have circular cross sections. The diameter of the first blow-by gas passage portion 43a is constant over the entire length in the extension direction of the first blow-by gas passage portion 43a. The diameter of the second blow-by gas passage portion 43b is also constant over the entire length in the extension direction of the second blow-by gas passage portion 43b.

The oil separator 50 is attached to the outer surface (side surface 11b1) of the cylinder block 11 at the second side in the width direction. A separation portion 52 that separates oil from the blow-by gas is defined inside the oil separator 50. The separation portion 52 is defined by the upper portion of the oil separator 50. As shown in FIG. 2, the separation portion 52 includes a plurality of parallel flat partitions 52a partitioning space having a fixed volume. Specifically, the partitions 52a are spaced apart in the up-down direction and alternately arranged in the width direction of the engine body 10. As a result, a staggered passage is defined by the partitions 52a in the separation portion 52. As shown in FIG. 1, the separation portion 52 is connected to one end of the return passage 44 by a PCV valve 45. The other end of the return passage 44 is connected to the surge tank 22 of the intake passage 20. The return passage 44 is formed by a pipe. In FIG. 1, the internal structure (partitions 52a) of the separation portion 52 is not shown.

Figure 2:
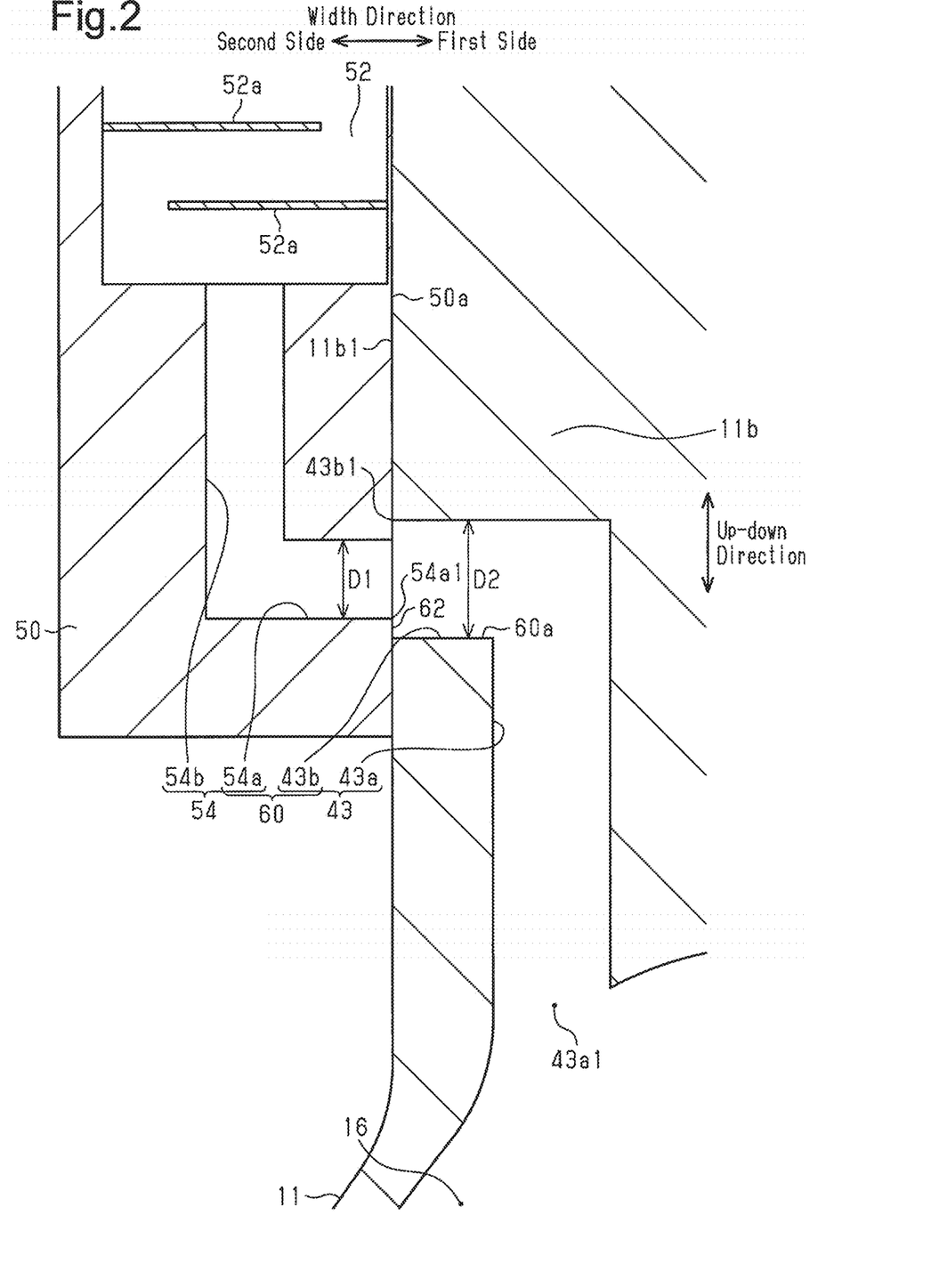
FIG. 2 is a cross-sectional view showing a blow-by gas passage of a cylinder block and part of an oil separator in the internal combustion engine of FIG. 1.

As shown in FIG. 2, a connection passage 54 is defined inside the oil separator 50. The connection passage 54 is located downward in the vertical direction from the separation portion 52. The connection passage 54 extends in an L-shaped manner in a cross-sectional view taken in a direction orthogonal to the axial direction of the crankshaft 100. That is, the connection passage 54 includes a first passage portion 54a extending in the horizontal direction and a second passage portion 54b extending upward in the vertical direction from the first passage 54a. The first passage portion 54a extends in the horizontal direction. Thus, the first passage portion 54a extends in a direction inclined by zero degrees relative to the horizontal plane. Further, as described above, the first blow-by gas passage portion 43a extends in the vertical direction. Thus, the first blow-by gas passage portion 43a extends in a direction inclined by an angle of 90 degrees relative to the horizontal plane. Since the first blow-by gas passage portion 43a extends in the vertical direction and the first passage portion 54a extends in the horizontal direction, the first passage portion 54a extends such that the inclination angle of the extension direction of the first passage portion 54a relative to the horizontal plane is less than the inclination angle of the extension direction of the first blow-by gas passage portion 43a relative to the horizontal plane.

The first passage portion 54a opens in a wall surface 50a (at right side of oil separator 50 in FIG. 2) of the oil separator 50 facing the cylinder block 11. The first passage portion 54a extends in the horizontal direction from an opening 54a1 of the first passage portion 54a in the wall surface 50a of the oil separator 50 toward the second side in the width direction of the internal combustion engine.

The second passage portion 54b extends upward in the vertical direction from the end of the first passage portion 54a at the second side in the width direction of the internal combustion engine. The second passage portion 54b is connected to the separation portion 52. In the present embodiment, the first passage portion 54a and the second passage portion 54b both have circular cross sections. The diameter (D1) of the first passage portion 54a is constant over the entire length in the extension direction of the first passage portion 54a. The diameter of the second passage portion 54b is also constant over the entire length in the extension direction of the second passage portion 54b. The diameter D1 of the first passage portion 54a is less than the diameter D2 of the second blow-by gas passage portion 43b of the cylinder block 11. Thus, the cross-sectional area of the first passage portion 54a is less than the cross-sectional area of the second blow-by gas passage portion 43b.

When the oil separator 50 is attached to the outer surface (side surface 11b1) of the cylinder block 11, the wall surface 50a of the oil separator 50 facing the cylinder block 11 abuts the side surface 11b1 of the cylinder block 11 at the second side in the width direction over the entire wall surface 50a of the oil separator 50 in the up-down direction. Further, the first passage portion 54a of the connection passage 54 of the oil separator 50 is connected to the second blow-by gas passage portion 43b of the cylinder block 11, and the first passage portion 54a and the second blow-by gas passage portion 43b are coaxial. The connection passage 54 connects the separation portion 52 to the second blow-by gas passage portion 43b in this manner. The connection passage 54 is located downward in the vertical direction from the separation portion 52 as described above. Thus, the separation portion 52 is located upward in the vertical direction from the opening 43b1 of the second blow-by gas passage portion 43b in the outer surface (side surface 11b1) of the cylinder block 11.

As described above, the cross-sectional area of the first passage portion 54a (based on D1) in the connection passage 54 of the oil separator 50 is less than the cross-sectional area of the second blow-by gas passage portion 43b (based on D2) in the cylinder block 11. The second blow-by gas passage portion 43b and the first passage portion 54a of the connection passage 54 are referred to as an intermediate passage 60, and a step 62 is arranged in an intermediate portion of the intermediate passage 60 with respect to an extension direction of the intermediate passage 60. The step 62 is formed because the cross-sectional area of a downstream side of the intermediate passage 60 with respect to the flow direction of blow-by gas is less than the cross-sectional area of an upstream portion of the intermediate passage 60 with respect to the flow direction of blow-by gas. Specifically, the wall surface 50a of the oil separator 50 facing the cylinder block 11 forms the step 62 at a location where the second blow-by gas passage portion 43b is connected to the first passage portion 54a of the connection passage 54. The step 62 includes a step surface (wall surface 50a) extending substantially orthogonal to the flow direction of the blow-by gas (extension direction of intermediate passage 60).

Further, as described above, the first passage portion 54a of the connection passage 54 and the second blow-by gas passage portion 43b are coaxial. In addition, since the area of the opening 43b1 (based on D2) of the second blow-by gas passage portion 43b is greater than the area of the opening 54a1 (based on D1) of the first passage portion 54a of the connection passage 54, the step 62 is formed outward in the radial direction of the opening 54a1 of the first passage portion 54a in the connection passage 54 around the entire opening 54a1 in the circumferential direction. In a cross-sectional view taken in a direction orthogonal to the extension direction of the intermediate passage 60, the lowermost portion of an inner wall surface of the intermediate passage 60 is referred to as a bottom 60a, and the step 62 includes part of the bottom 60a. Specifically, the step 62 includes the part of the bottom 60a where the step 62 is located in the extension direction of the intermediate passage 60.

The operation and advantages of the present embodiment will now be described.

(1) During engine operation, the pressure at the downstream side of the throttle body 21 in the intake passage 20 is negative and lower than atmospheric pressure. When the PCV valve 45 opens, blow-by gas is drawn from the crank chamber 16 into the intake passage 20 through the blow-by gas passage 43, the oil separator 50, and the return passage 44. In this case, air is drawn from an upstream portion of the throttle body 21 in the intake passage 20 into the crank chamber 16 through the upstream fresh air inlet passage 41 and the downstream fresh air inlet passage 42.

When blow-by gas is drawn from the crank chamber 16 to the intake passage 20, the blow-by gas flows through the separation portion 52 of the oil separator 50. When the blow-by gas enters the separation portion 52, the blow-by gas strikes the partitions 52a of the separation portion 52. As a result, the fine particles of oil in the blow-by gas are collected and liquefied on the partitions 52a. The liquefied oil falls from the separation portion 52 into the connection passage 54.

The oil discharged out of the separation portion 52 into the connection passage 54 flows down the second passage portion 54b of the connection passage 54 toward the inside of the oil pan 19 through the first passage portion 54a of the connection passage 54 and the blow-by gas passage 43. In this case, if the blow-by gas rushes into the blow-by gas passage 43 from the crank chamber 16, the flow of the blow-by gas forces the oil back toward the separation portion 52 (downstream side with respect to flow direction of blow-by gas).

The second blow-by gas passage portion 43b and the first passage portion 54a of the connection passage 54 extend in the horizontal direction. Thus, the oil in these passages are forced back more easily toward the separation portion 52 by the flow of the blow-by gas than the second passage portion 54b in the connection passage 54 and the first blow-by gas passage portion 43a that extend in the up-down direction. However, in the present embodiment, the step 62 is located where the second blow-by gas passage portion 43b is connected to the first passage portion 54a of the connection passage 54. Thus, the step 62 blocks the oil moved by the blow-by gas that is collected on the inner wall surface of the second blow-by gas passage portion 43b at the upstream of the step 62 with respect to the flow direction of the blow-by gas. This limits further flow of the oil toward the separation portion 52. Thus, the backflow of the oil toward the separation portion 52 is limited.

(2) The second blow-by gas passage portion 43b and the first passage portion 54a of the connection passage 54 extend in the horizontal direction. Thus, the oil in these passages easily collects on the bottom 60a defined by a lower portion of the inner wall surface of the passages in the vertical direction. In the present embodiment, the step 62 where the second blow-by gas passage portion 43b is connected to the first passage portion 54a of the connection passage 54 includes part of the bottom 60a. Thus, the step 62 at the bottom 60a of the second blow-by gas passage portion 43b easily blocks the oil moved by blow-by gas. Further, the oil may be scattered upward in the vertical direction from the bottom 60a by the flow of blow-by gas or the like and collect on an upper portion of the inner wall surface of the second blow-by gas passage portion 43b. In the present embodiment, the step 62 where the second blow-by gas passage portion 43b is connected to the first passage portion 54a of the connection passage 54 extends outward in the radial direction of the opening 54a1 of the first passage portion 54a of the connection passage 54 over the entire opening 54a1 in the circumferential direction. Thus, the step 62 blocks the oil flowing from any circumferential portion in the inner wall surface of the second blow-by gas passage portion 43b.

(3) In the present embodiment, the diameter (D1) of the first passage portion 54a of the connection passage 54 is constant over the entire length in the extension direction of the first passage portion 54a. That is, the first passage portion 54a has no recesses or steps caused by changes in the cross-sectional area of the first passage portion 54a. Thus, when the oil separated by the separation portion 52 flows through the first passage portion 54a toward the oil pan 19 (upstream side in the flow direction of blow-by gas), the flow of oil is not interrupted by a recess or a step. The same applies to the second blow-by gas passage portion 43b.

(4) As described in advantage (2), when the blow-by gas moves the oil collected in the bottom 60a of the second blow-by gas passage portion 43b, the oil is blocked by the step 62. When the amount of oil blocked by the step 62 increases, the oil spreads toward the first blow-by gas passage portion 43a on the bottom 60a of the second blow-by gas passage portion 43b. Since the second blow-by gas passage portion 43b has no recesses or steps as described above, the flow of the oil is not interrupted. Thus, the oil flows smoothly in the second blow-by gas passage portion 43b toward the first blow-by gas passage portion 43a, reaches the first blow-by gas passage portion 43a, and flows down the first blow-by gas passage portion 43a. The oil is efficiently discharged into the oil pan 19 accordingly.

(5) With the structure of the present embodiment, the step 62 is formed by merely setting the diameter D2 of the second blow-by gas passage portion 43b differently from the diameter D1 of the first passage portion 54a of the connection passage 54. This simplifies the manufacturing process of the internal combustion engine without the need for additional parts or complicated processing.

The present embodiment may be modified and implemented as follows. The present embodiment and the following modifications may be implemented in combination as long as there are no technical contradictions.

Figure 3:
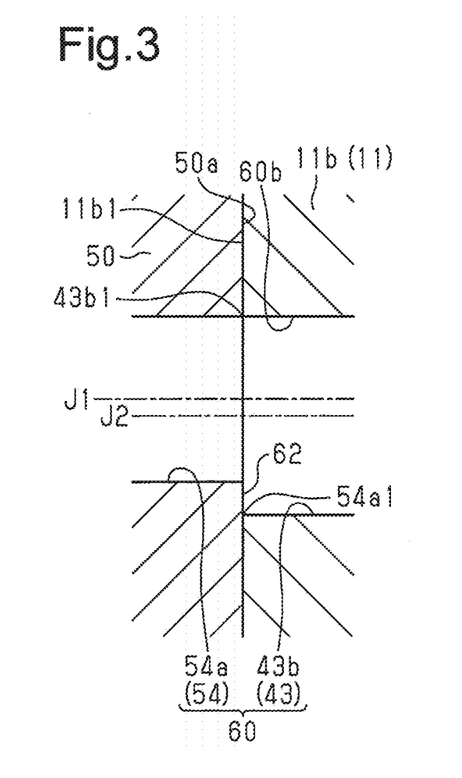
FIG. 3 is a cross-sectional view showing a modification of an intermediate passage.

The first passage portion 54a of the connection passage 54 of the oil separator 50 may be connected to the second blow-by gas passage portion 43b of the cylinder block 11 in a state in which the first passage portion 54a and the second blow-by gas passage portion 43b are not coaxial. In such a case, a step may be formed where the first passage portion 54a is connected to the second blow-by gas passage portion 43b. For example, as shown in the modification of FIG. 3, a center axis J1 of the first passage portion 54a may be positioned upward from a center axis J2 of the second blow-by gas passage portion 43b. In a cross-sectional view taken in a direction orthogonal to the extension direction of the intermediate passage 60, the uppermost portion of the inner wall surface of the intermediate passage 60 is referred to as a top portion 60b, and the top portion 60b of the first passage portion 54a is continuous with the top portion 60b of the second blow-by gas passage portion 43b in the modification shown in FIG. 3. Even in such a case, the step 62 is formed where the first passage portion 54a is connected to the second blow-by gas passage portion 43b except at the top portion 60b.

The modification in FIG. 3 shows that the step 62 does not necessarily need to be formed outward in the radial direction of the opening 54a1 of the first passage portion 54a around the entire opening 54a1 in the circumferential direction.

That is, the flow of oil can be blocked as long as the step 62 is formed around at least part of the opening 54a1 in the circumferential direction.

The first passage portion 54a may be connected to the second blow-by gas passage portion 43b with the diameter D1 of the first passage portion 54a of the connection passage 54 of the oil separator 50 set to be the same as the diameter D2 of the second blow-by gas passage portion 43b of the cylinder block 11, and the first passage portion 54a and the second blow-by gas passage portion 43b set not to be coaxial. Even in such a case, a step is formed where the first passage portion 54a is connected to the second blow-by gas passage portion 43b. Specifically, even in such a case, the step is substantially formed in an intermediate portion of the extension direction of the intermediate passage 60 when the cross-sectional area of the intermediate passage 60 at a downstream side with respect to the flow direction of blow-by gas (place where first passage portion 54a is connected to second blow-by gas passage portion 43b) is less than the cross-sectional area of the intermediate passage 60 at an upstream side in the flow direction of blow-by gas (second blow-by gas passage portion 43b).

The step may be formed at a location that differs from where the first passage portion 54a of the connection passage 54 of the oil separator 50 is connected to the second blow-by gas passage portion 43b of the cylinder block 11. In the modification in FIG. 4, for example, a diameter C1 of the opening 54a1 of the first passage portion 54a is the same as a diameter C2 of the opening 43b1 of the second blow-by gas passage portion 43b. A tubular ring member R is arranged on the inner wall surface of the first passage portion 54a in an intermediate portion of the extension direction of the first passage portion 54a. The inner wall surface of the ring member R forms part of the inner wall surface of the first passage portion 54a. Since a diameter C3 of the inner wall surface of the ring member R is less than the diameter C1 of portions other than the ring member R in the first passage portion 54a, the cross-sectional area of the first passage portion 54a at the location where the ring member R is arranged is less than the cross-sectional area of the first passage portion 54a at an upstream side in the flow direction of blow-by gas (right side in FIG. 4) relative to the ring member R. Accordingly, an end surface of the tubular ring member R directed toward the second blow-by gas passage portion 43b forms the step 62 extending in a direction substantially orthogonal to the flow direction of blow-by gas (extension direction of intermediate passage 60).

Figure 4:
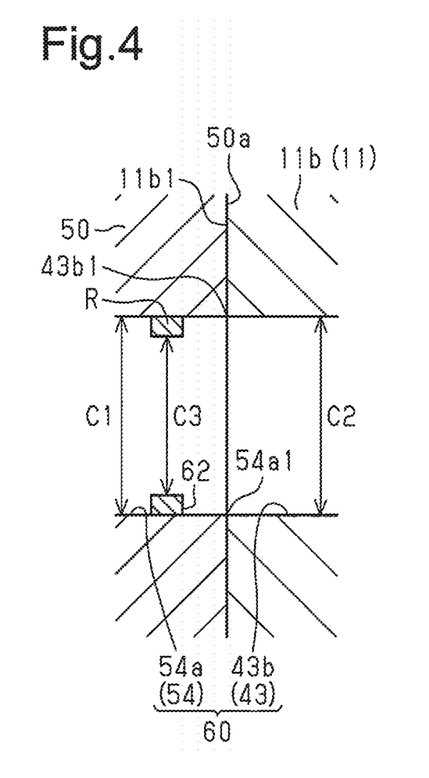
FIG. 4 is a cross-sectional view showing another modification of the intermediate passage.

In the modification in FIG. 4, the cross-sectional area of the first passage portion 54a at a downstream side in the flow direction of blow-by gas (left side in FIG. 4) relative to the ring member R is greater than the location where the ring member R is arranged. That is, the first passage portion 54a (intermediate passage 60) does not need to have a constant cross-sectional area over the entire area in the extension direction of the first passage portion 54a at the downstream side of the step 62 in the flow direction of blow-by gas. The cross-sectional area of the first passage portion 54a may gradually vary at the downstream side of the step 62 in the flow direction of blow-by gas regardless of whether the ring member R is used or not.

In the modification shown in FIG. 4, the ring member R does not need to be entirely continuous in the circumferential direction. The ring member R may be C-shaped, for example. In this case, the step 62 is not formed at a location where the ring member R is not continuous.

The ring member R shown in FIG. 4 may be arranged in the second blow-by gas passage portion 43b instead of the first passage portion 54a to form the step on the second blow-by gas passage portion 43b.

Figure 5:
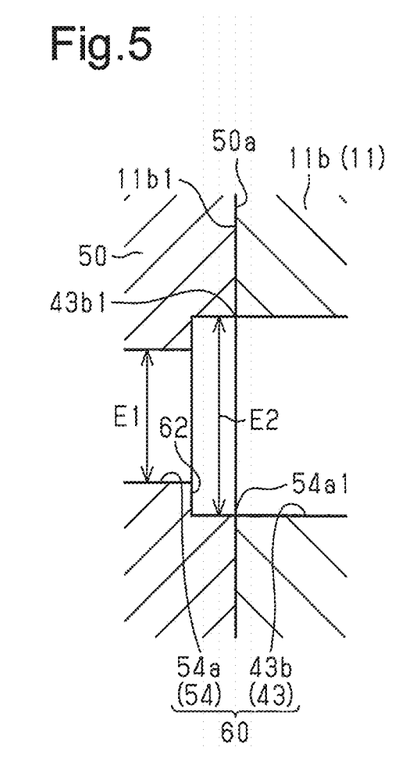
FIG. 5 is a cross-sectional view showing further modification of the intermediate passage.

The diameter of the first passage portion 54a in the connection passage 54 of the oil separator 50 may be changed in an intermediate portion with respect to the extension direction of the first passage portion 54a instead of arranging the ring member R. This forms the step. In the modification shown in FIG. 5, a diameter E1 of the first passage portion 54a at a downstream side in the flow direction of blow-by gas (left side in FIG. 5) is less than a diameter E2 of the first passage portion 54a at an upstream portion in the flow direction of blow-by gas (right side in FIG. 5) so that the first passage portion 54a is stepped as a whole. This forms the step 62 in the first passage portion 54a at the boundary between the upstream portion and the downstream side in the flow direction of blow-by gas.

The diameter of the second blow-by gas passage portion 43b may be changed to form a step in an intermediate portion of the extension direction of the second blow-by gas passage portion 43b of the cylinder block 11.

The step 62 does not need to extend orthogonally to the flow direction of blow-by gas (extension direction of intermediate passage 60). The step 62 can still block the flow of oil even if the step 62 is inclined relative to the extension direction of the intermediate passage 60.

The cross-sectional shape of the first passage portion 54a of the connection passage 54 of the oil separator 50 may be noncircular. Further, the cross-sectional shape of the first passage portion 54a may be changed in an intermediate portion of the extension direction of the first passage portion 54a. Further, the cross-sectional area of the first passage portion 54a does not need to be constant over the entire length in the extension direction of the first passage portion 54a but may change in stages in an intermediate portion or gradually change in the extension direction. Further, the first passage portion 54a does not necessarily need to extend straight and may be curved. Such a modification of the shape of the first passage portion 54a may be applied to the second blow-by gas passage portion 43b of the cylinder block 11. That is, the intermediate passage 60 including the first passage portion 54a and the second blow-by gas passage portion 43b may include a step formed in an intermediate portion of the extension direction of the intermediate passage 60 when the cross-sectional area of the intermediate passage 60 is less than the upstream side in the flow direction of blow-by gas.

The first passage portion 54a of the connection passage 54 of the oil separator 50 does not necessarily need to extend in the horizontal direction as long as the inclination angle of the extension direction of the first passage portion 54a relative to the horizontal plane is less than the inclination angle of the extension direction of the first blow-by gas passage portion 43a of the cylinder block 11 relative to the horizontal plane. The same applies to the second blow-by gas passage portion 43b of the cylinder block 11. That is, the inclination angle of the extension direction of the second blow-by gas passage portion 43b relative to the horizontal plane may be less than the inclination angle of the extension direction of the first blow-by gas passage portion 43a relative to the horizontal plane.

The shape and the extension direction of the first blow-by gas passage portion 43a of the cylinder block 11 may be changed as long as the first blow-by gas passage portion 43a opens toward the lower surface of the cylinder block 11 and entirely extends upward in the vertical direction.

An internal combustion engine inclined relative to the up-down direction of a vehicle may be mounted in the vehicle. Depending on the position of the internal combustion engine mounted in the vehicle, the first blow-by gas passage portion 43a of the cylinder block 11 may be inclined relative to the vertical direction. Alternatively, the second blow-by gas passage portion 43b or the first passage portion 54a of the connection passage 54 of the oil separator 50 may be inclined relative to the horizontal plane. The structure of the disclosure provides desired functions in such an inclined condition.

The shape and the extension direction of the second passage portion 54b of the connection passage 54 of the oil separator 50 may be changed as long as the first passage portion 54a is connected to the separation portion 52 through the second passage portion 54b. The inclination angle of the second passage portion 54b relative to the horizontal plane is preferably large so that oil separated from blow-by gas by the separation portion 52 flows down.

The oil separator 50 may include, independently of the connection passage 54, a passage to return oil separated out of blow-by gas by the separation portion 52 to the oil pan 19.

The structure of the separation portion 52 of the oil separator 50 may be changed as long as the separation portion 52 is configured to separate oil, which is contained in blow-by gas, out of the blow-by gas.

The wall surface 50a of the oil separator 50 facing the cylinder block 11 does not need to abut the side surface 11b1 of the cylinder block 11 at the second side in the width direction over the entire wall surface 50a in the up-down direction as long as the wall surface 50a of the oil separator 50 abuts only the periphery of the opening 43b1 of the second blow-by gas passage portion 43b on the outer surface of the cylinder block 11.

The present examples and embodiments are to be considered as illustrative and not restrictive, and the invention is not to be limited to the details given herein, but may be modified within the scope and equivalence of the appended claims.

The invention claimed is:

1. An internal combustion engine comprising:
   a cylinder block;
   a blow-by gas passage defined inside the cylinder block, wherein the blow-by gas passage is configured to return blow-by gas to an intake passage; and
   an oil separator connected to the blow-by gas passage and the intake passage, wherein the oil separator is configured to separate oil from the blow-by gas, wherein
   in a state in which the internal combustion engine is mounted on a vehicle, an up-down direction of the vehicle is referred to as a vertical direction, and a plane orthogonal to the vertical direction is referred to as a horizontal plane,
   the blow-by gas passage includes
      a first blow-by gas passage portion open downward in the vertical direction of the cylinder block, wherein the first blow-by gas passage portion extends upward in the vertical direction of the cylinder block from an opening of the first blow-by gas passage portion directed downward in the vertical direction, and
      a second blow-by gas passage portion continuous with the first blow-by gas passage portion, wherein the second blow-by gas passage portion extends so that an inclination angle of an extension direction of the second blow-by gas passage portion relative to the horizontal plane is less than an inclination angle of an extension direction of the first blow-by gas passage portion relative to the horizontal plane, and the second blow-by gas passage portion opens in an outer surface of the cylinder block,
   the oil separator includes
      a separation portion located upward from an opening of the second blow-by gas passage portion in the outer surface of the cylinder block, wherein the separation portion is configured to separate oil from the blow-by gas, and
      a connection passage connecting the separation portion and the second blow-by gas passage portion,
   at least part of the connection passage that is located toward the second blow-by gas passage portion serves as a first passage portion, wherein the first passage portion is configured to extend so that an inclination angle of the first passage portion relative to the horizontal plane is less than an inclination angle of an extension direction of the first blow-by gas passage portion relative to the horizontal plane, and
   the second blow-by gas passage portion and the first passage portion of the connection passage are referred to as an intermediate passage, and a step is arranged in the intermediate passage at an intermediate portion with respect to an extension direction of the intermediate passage, wherein the intermediate passage has a cross-sectional area at a downstream side with respect to a flow direction of the blow-by gas that is smaller than a cross-sectional area of the intermediate passage at an upstream side with respect to the flow direction of the blow-by gas.

2. The internal combustion engine according to claim 1, wherein the cross-sectional area of the intermediate passage at the downstream side of the step with respect to the flow direction of the blow-by gas entirely has a constant cross-sectional area in an extension direction of the downstream side.

3. The internal combustion engine according to claim 1, wherein
   the opening of the second blow-by gas passage portion in the outer surface of the cylinder block has an area that is larger than an area of the opening of the connection passage located toward the second blow-by gas passage portion, and
   the step is located where the second blow-by gas passage portion is connected to the connection passage.

4. The internal combustion engine according to claim 1, wherein
   the intermediate passage that includes an inner wall surface having a lowermost portion is referred to as a bottom in a cross-sectional view orthogonal to the extension direction of the intermediate passage, and
   the step is arranged on at least the bottom.

5. An oil separator connected to a blow-by gas passage and an intake passage of an internal combustion engine, wherein the blow-by gas passage is defined inside a cylinder block to return blow-by gas to the intake passage, and in a state in which the internal combustion engine is mounted on a vehicle, an up-down direction of the vehicle is referred to as a vertical direction, and a plane orthogonal to the vertical direction is referred to as a horizontal plane, the blow-by gas passage includes a first blow-by gas passage portion open downward in the vertical direction of the cylinder block, wherein the first blow-by gas passage portion extends upward in the vertical direction of the cylinder block from an opening directed downward in the vertical direction, and a second blow-by gas passage portion continuous with the first blow-by gas passage portion, wherein the second blow-by gas passage portion extends so that an inclination angle of an extension direction of the second blow-by gas passage portion relative to the horizontal plane is less than an inclination angle of an extension direction of the first blow-by gas passage portion relative to the horizontal plane, and the second blow-by gas passage portion opens in an outer surface of the cylinder block, the oil separator comprising:
- a separation portion located upward from an opening of the second blow-by gas passage portion in the outer surface of the cylinder block, wherein the separation portion is configured to separate oil from the blow-by gas, and
- a connection passage that connects the separation portion and the second blow-by gas passage portion, wherein
- at least part of the connection passage located toward the second blow-by gas passage portion serves as a first passage portion, wherein the first passage portion is configured to extend so that an inclination angle of the first passage portion relative to the horizontal plane is less than an inclination angle of an extension direction of the first blow-by gas passage portion relative to the horizontal plane, and
- the second blow-by gas passage portion and the first passage portion of the connection passage are referred to as an intermediate passage, and a step is arranged in the intermediate passage at an intermediate portion with respect to an extension direction, wherein the intermediate passage has a cross-sectional area at a downstream side with respect to a flow direction of the blow-by gas that is smaller than a cross-sectional area of the intermediate passage at an upstream side with respect to the flow direction of the blow-by gas.

6. A method for manufacturing an internal combustion engine, the method comprising:
- forming a blow-by gas passage inside a cylinder block to return blow-by gas to an intake passage;
- providing an oil separator to separate oil from the blow-by gas; and
- connecting the oil separator to the blow-by gas passage and the intake passage, wherein
- in a state in which the internal combustion engine is mounted on a vehicle, an up-down direction of the vehicle is referred to as a vertical direction, and a plane orthogonal to the vertical direction is referred to as a horizontal plane,
- the forming a blow-by gas passage includes
  - forming a first blow-by gas passage portion open downward in the vertical direction of the cylinder block, wherein the first blow-by gas passage portion extends upward in the vertical direction of the cylinder block from an opening of the first blow-by gas passage portion directed downward in the vertical direction, and
  - forming a second blow-by gas passage portion continuously with the first blow-by gas passage portion, wherein the second blow-by gas passage portion extends so that an inclination angle of an extension direction of the second blow-by gas passage portion relative to the horizontal plane is less than an inclination angle of an extension direction of the first blow-by gas passage portion relative to the horizontal plane, and the second blow-by gas passage portion opens in an outer surface of the cylinder block,
- the providing an oil separator includes
  - forming a separation portion located upward from an opening of the second blow-by gas passage portion in the outer surface of the cylinder block, wherein the separation portion is configured to separate oil contained in blow-by gas,
  - forming a connection passage connecting the separation portion and the second blow-by gas passage portion, and
  - forming a first passage portion that is at least part of the connection passage located toward the second blow-by gas passage portion, wherein the first passage portion extends so that an inclination angle of the first passage portion relative to the horizontal plane is less than an inclination angle of an extension direction of the first blow-by gas passage portion relative to the horizontal plane, and
- the connecting the oil separator to the blow-by gas passage and the intake passage includes
  - when the second blow-by gas passage portion and the first passage portion of the connection passage are referred to as an intermediate passage, arranging a step in the intermediate passage at an intermediate portion with respect to an extension direction of the intermediate passage, wherein the intermediate passage has a cross-sectional area at a downstream side with respect to a flow direction of the blow-by gas that is smaller than a cross-sectional area of the intermediate passage at an upstream side with respect to the flow direction of the blow-by gas.

* * * * *